UNITED STATES PATENT OFFICE.

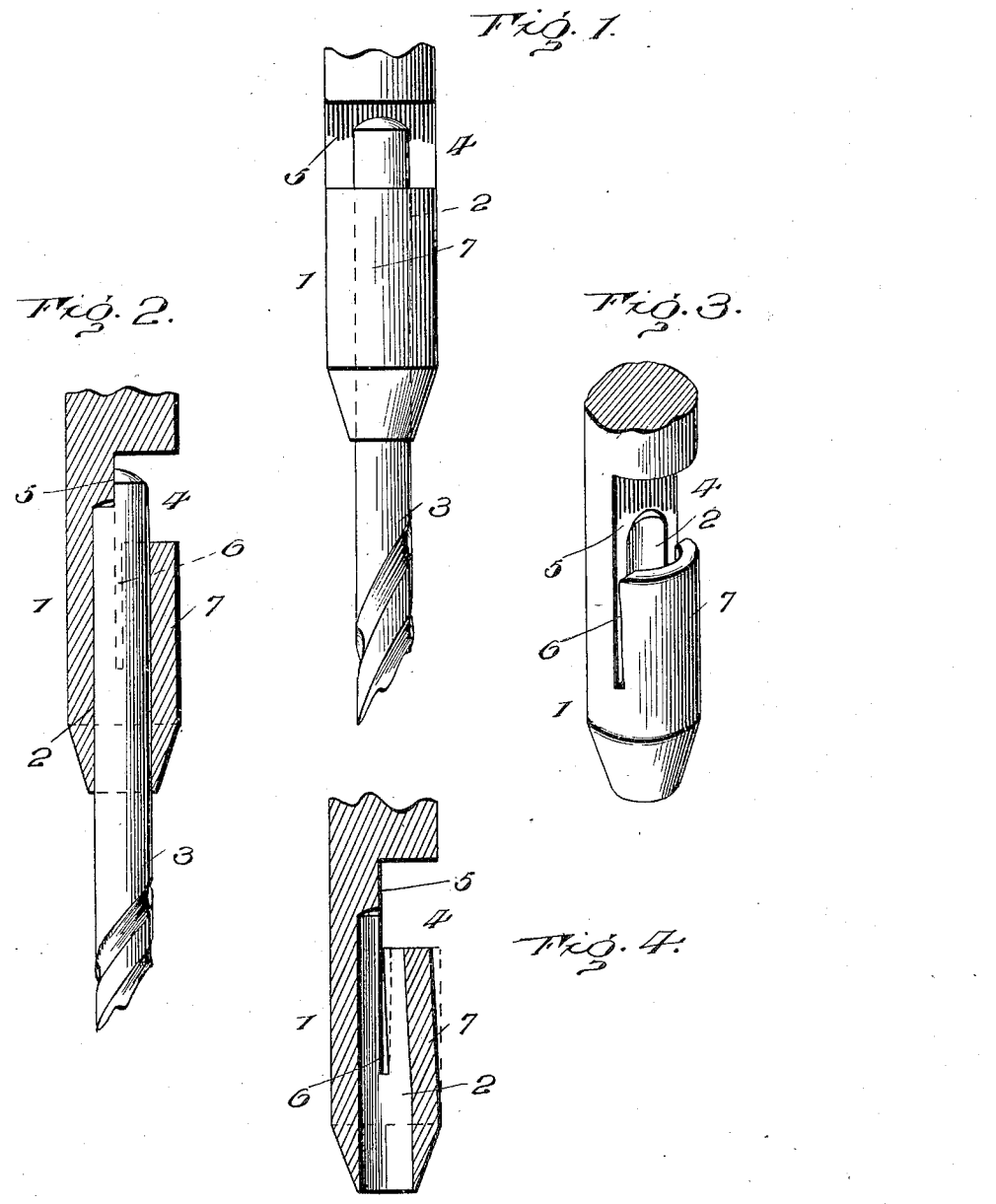

EDWARD C. WYSONG, OF EATON, OHIO.

DRILL-CHUCK.

SPECIFICATION forming part of Letters Patent No. 726,388, dated April 28, 1903.

Application filed February 4, 1903. Serial No. 141,885. (No model.)

*To all whom it may concern:*

Be it known that I, EDWARD C. WYSONG, a citizen of the United States, residing at Eaton, in the county of Preble and State of Ohio, have invented certain new and useful Improvements in Drill-Chucks, of which the following is a specification.

This invention provides a simple, effective, and substantial holder of novel form for drills, bits, and like tools having a straight shank, said holder automatically gripping the drill, so as to prevent displacement thereof and obviating the use of securing means, such as clamp-screws, pins, and cam-operated jaws.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a side elevation of a drill-holder or chuck embodying the invention and illustrating the application of a drill thereto. Fig. 2 is a central longitudinal section of the chuck and side elevation of the drill. Fig. 3 is a perspective view of the chuck, the drill being detached. Fig. 4 is a detail view illustrating the operation of the chuck, the full lines showing the normal position of the spring-clamp and the dotted lines illustrating its position when pressed out by the insertion of the drill into the bore.

Corresponding and like parts are referred to in the following description and indicated in all the views of the drawings by the same reference characters.

The body of the chuck or holder is indicated at 1 and may be of any shape and is provided with a longitudinal bore 2 for reception of the shank of the drill or bit 3. The diameter of the bore 2 corresponds with the diameter of the shank of the drill or bit, so as to snugly receive the same and prevent any lateral play or movement. The body is cut away at one side, as shown at 4, the cut-away portion or notch intersecting with the inner end of the bore 2 and extending some distance in the rear thereof to provide a flat face for engagement therewith of the flat face 5, formed at the inner end of the drill-shank by cutting away a portion thereof. The saw cut 6 extends lengthwise of the chuck or holder from the outer or lower end of the cut-away portion 4 and in line with the inner wall thereof to form a spring-clamp 7, which automatically grips the inner end of the shank when the drill is pressed into the bore of the chuck. The end portion of the part 7 adjacent to the notch or cut-away portion 4 is pressed inward, so as to reduce the width of the saw cut 6 and contract the bore 2 at its inner end, thereby causing the part 7 to grip the shank of the drill when the latter is properly applied to the chuck and forced home into the bore thereof.

The chuck or holder is adapted for use in connection with a number of drills or like tools having shanks of uniform diameter, and when the drill or like tool is forced home into the chuck with its flat face 5 in engagement with the inner flat walls of the cut-away portion 4 the drill is caused to turn with the chuck and is prevented from casual displacement by the clamping action of the part 7. The drill may be removed from the chuck by inserting a pry into the cut-away portion 4 and exerting an endwise pressure upon the inner end of the drill-shank. It may also be removed by gripping the drill and pulling thereon with sufficient force to overcome the clamping action of the part 7. The outer end of the chuck or holder is intact and sustains the lateral thrust coming upon the drill when in use, thereby relieving the clamp portion 7 of all strain excepting that necessary to hold the drill or tool in place.

Having thus described the invention, what is claimed as new is—

A chuck or holder for drills and like tools, the same comprising a body having a longitudinal bore and having a notch or cut-away portion in its side intersecting with the inner end of said bore and having a longitudinal saw cut extended from the outer end of the cut-away portion about in line with the inner wall thereof to form a spring-clamp, the end portion of said cut bordering upon the notch being contracted by having the said clamp portion pressed inward, substantially as set forth.

In testimony whereof I affix my signature in presence of two witnesses.

EDWARD C. WYSONG. [L. S.]

Witnesses:
    HARRY G. KING,
    P. A. SAYLOR.